(12) United States Patent
Hucek

(10) Patent No.: US 12,552,000 B2
(45) Date of Patent: Feb. 17, 2026

(54) SLAG REMOVAL APPARATUS AND METHODS FOR REMOVING SLAG THEREOF

(71) Applicant: ARCLINE LLC, South Elgin, IL (US)

(72) Inventor: Marc P. Hucek, South Elgin, IL (US)

(73) Assignee: Arcline LLC, St. Charles, IL (US)

( * ) Notice: Subject to any disclaimer, the term of this patent is extended or adjusted under 35 U.S.C. 154(b) by 267 days.

(21) Appl. No.: 18/106,887

(22) Filed: Feb. 7, 2023

(65) Prior Publication Data
US 2023/0249328 A1  Aug. 10, 2023

Related U.S. Application Data

(60) Provisional application No. 63/307,342, filed on Feb. 7, 2022.

(51) Int. Cl.
B25F 1/00 (2006.01)

(52) U.S. Cl.
CPC .................................... B25F 1/006 (2013.01)

(58) Field of Classification Search
CPC .................................... B25F 1/006; B25F 1/00
USPC ...... 7/144, 149, 158, 159; D8/7, 81, 95, 105
See application file for complete search history.

(56) References Cited

U.S. PATENT DOCUMENTS

| | | | |
|---|---|---|---|
| 470,889 A | 3/1892 | Hammer | |
| 1,972,540 A | 9/1934 | Kirby | |
| 2,019,099 A | 10/1935 | Schwartz | |
| 2,226,673 A | 12/1940 | St Pierre | |
| 2,293,081 A * | 8/1942 | Savoy | B23K 5/22 15/176.3 |
| 2,337,440 A | 12/1943 | Arrowood | |
| 2,423,189 A | 7/1947 | Honhart | |
| 2,519,016 A | 8/1950 | Bernard | |
| 2,592,648 A | 4/1952 | Bowers | |
| 2,814,093 A | 11/1957 | Hulvey | |
| 2,908,962 A | 10/1959 | Wagner | |
| 3,336,647 A | 8/1967 | Ernest | |
| 3,380,096 A | 4/1968 | Marston | |
| 3,599,255 A | 8/1971 | Carroll, Sr. | |
| 3,629,883 A | 12/1971 | Norman | |
| 3,821,824 A | 7/1974 | Pilcher | |
| 4,242,780 A | 1/1981 | Littman | |
| 4,741,060 A * | 5/1988 | Hose | B25B 13/02 7/138 |
| 4,985,954 A * | 1/1991 | Wehr | B25F 1/00 30/318 |
| 5,018,409 A | 5/1991 | Bittel | |

(Continued)

FOREIGN PATENT DOCUMENTS

| | | |
|---|---|---|
| CN | 206952298 | 2/2018 |
| GB | 2362870 | 5/2001 |

(Continued)

*Primary Examiner* — Hadi Shakeri
(74) *Attorney, Agent, or Firm* — Patzik, Frank & Samotny, Ltd

(57) ABSTRACT

The present disclosure is directed to a novel slag removal tool that combines an integrated sawtooth edge with a chipping hammer and a metal notch for securing and opening various ring pull or pull tabs on metal compartments, and facilitating the removal of a slag portion from a welded surface by eliminating the need to switch tools during the removal process.

14 Claims, 3 Drawing Sheets

(56) References Cited

U.S. PATENT DOCUMENTS

| | | | |
|---|---|---|---|
| 5,020,181 A * | 6/1991 | Leonard | A47L 25/00 |
| | | | 15/236.08 |
| 5,433,005 A | 7/1995 | Cogdill | |
| D388,303 S | 12/1997 | Berggren | |
| D390,082 S | 2/1998 | Higgs | |
| 5,983,430 A | 11/1999 | Clark | |
| 6,460,210 B1 | 10/2002 | Alpert | |
| 6,539,824 B2 | 4/2003 | Wedhorn | |
| 6,945,137 B1 | 9/2005 | Hawkins | |
| 7,025,331 B2 * | 4/2006 | Whelan | B25F 1/02 |
| | | | 254/25 |
| 7,269,867 B2 * | 9/2007 | Karlstedt | B44D 3/162 |
| | | | 7/164 |
| D678,017 S | 3/2013 | Mühlenbruch | |
| 9,021,641 B2 | 5/2015 | Leach et al. | |
| D746,655 S | 1/2016 | Wackwitz | |
| 2015/0328761 A1 * | 11/2015 | Busch | A01B 1/022 |
| | | | 7/169 |

FOREIGN PATENT DOCUMENTS

| | | |
|---|---|---|
| KR | 2020100012445 | 6/2012 |
| KR | 200482174 Y1 | 1/2017 |

* cited by examiner

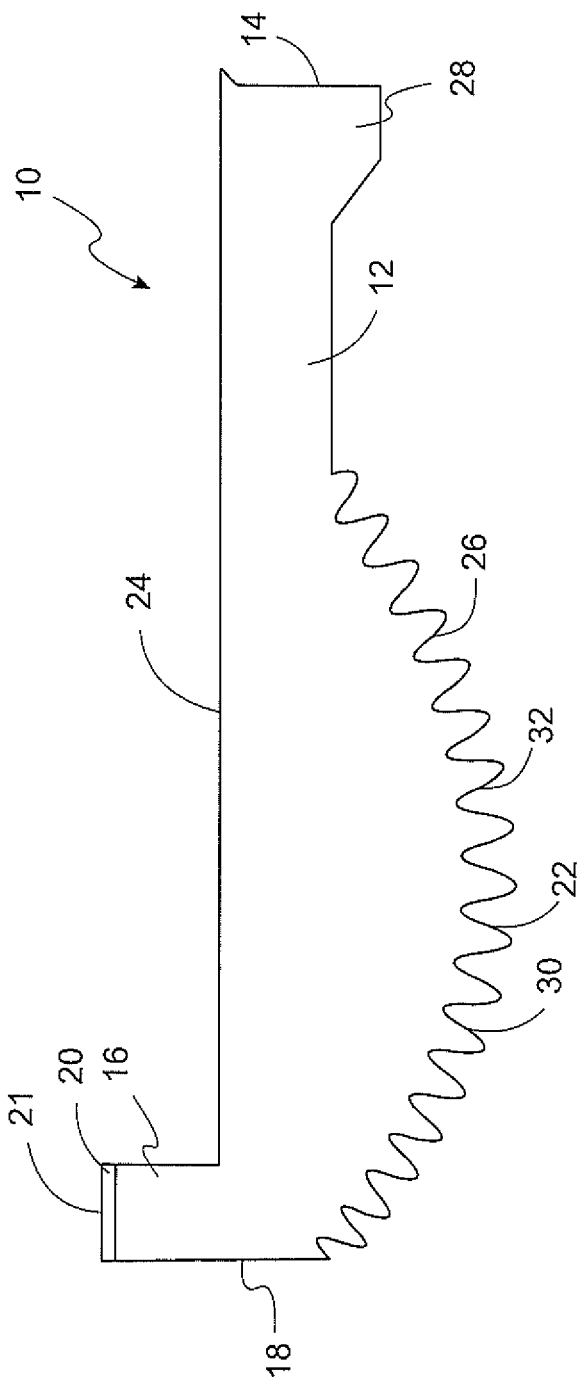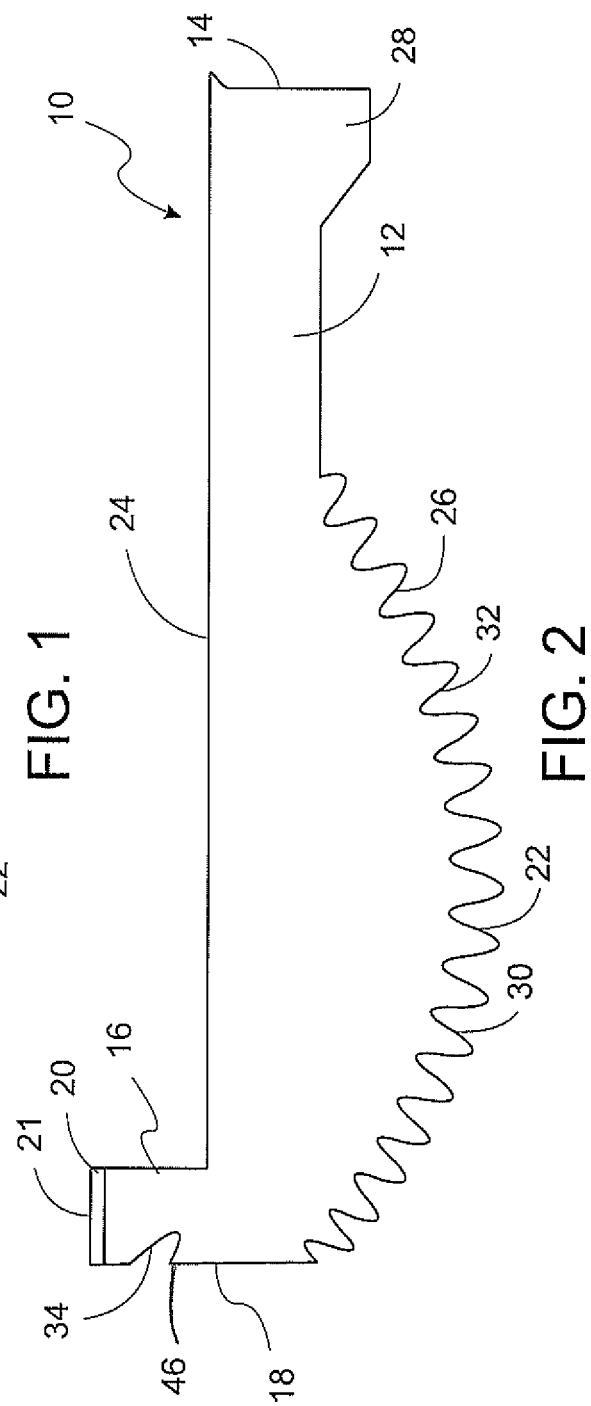

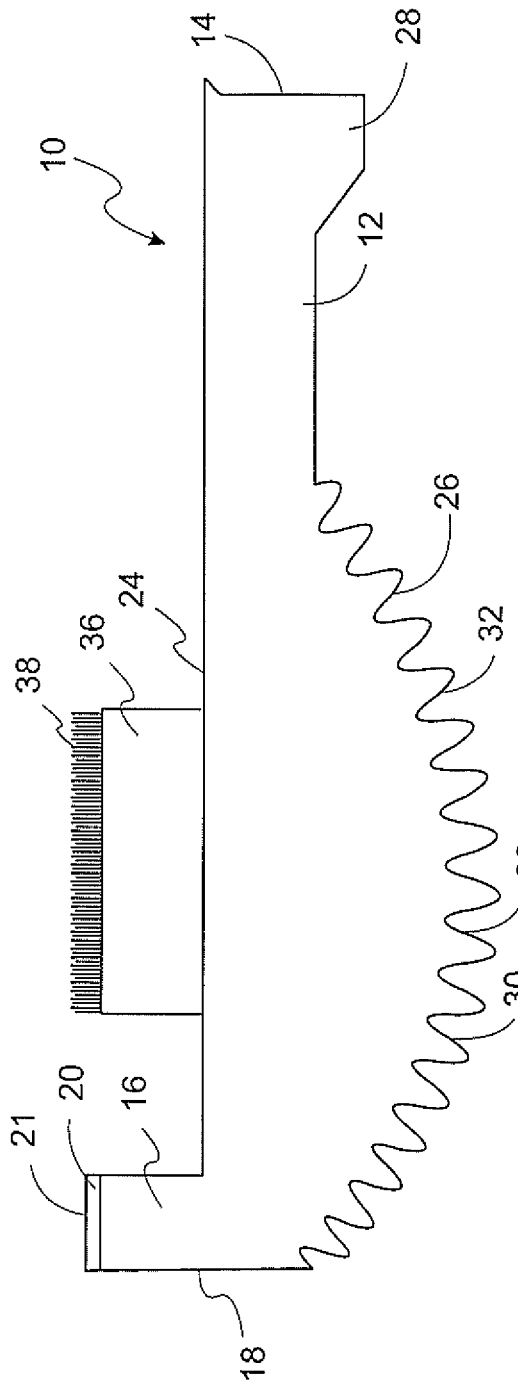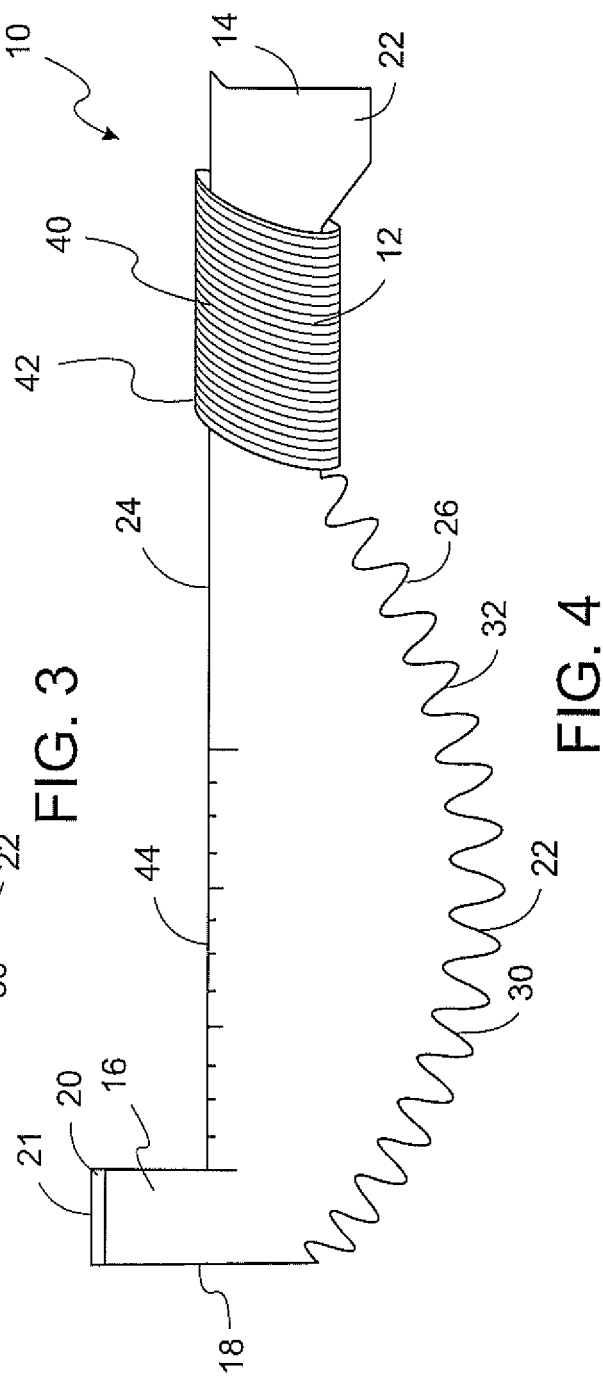

SLAG REMOVAL APPARATUS AND METHODS FOR REMOVING SLAG THEREOF

PRIORITY STATEMENT

This application claims the benefit of U.S. Provisional Application Ser. No. 63/307,342, filed Feb. 7, 2022, which is expressly incorporated by reference herein.

FIELD OF THE DISCLOSURE

The present disclosure relates to a novel slag removal apparatus, and in particular, the present disclosure relates to a device that integrates multiple slag removal tools into a single design for simplifying and facilitating the removal of slag from a welded product.

The present disclosure relates to, inter alia, a slag removal tool that combines an integrated sawtooth edge with a chipping hammer to facilitate the removal of slag from a welded piece by eliminating the need to switch tools during the removal process.

The present disclosure relates to, inter alia, a slag removal tool that combines an integrated sawtooth edge with a chipping hammer and a metal notch for securing and opening various ring pull or pull tabs on metal compartments or enclosures, to facilitate the removal of slag from a welded piece by eliminating the need to switch tools during the removal process.

The present disclosure relates to, inter alia, a slag removal tool that combines an integrated sawtooth edge with a chipping hammer and a wire brush to facilitate the removal of slag from a welded piece by eliminating the need to switch tools during the removal process.

The slag removal apparatus of the present disclosure is used to chip or hammer away slag from the ends of the weld and then used to saw off the center and ends of the weld to further remove slag and smooth out the surface of the weld. The slag removal apparatus of the present disclosure in an embodiment is configured with a can opener mechanism or an oblong opening with an edge that allows for a leverage pull of a tab, creating an even pull to facilitate the opening of a pull tab from a metal enclosure, such as a hermetically sealed welding rod can.

The slag removal apparatus of the present disclosure is used to chip or hammer away slag from the ends of the weld and then used to saw off the center and ends of the weld to further remove slag and smooth out the surface of the weld. The slag removal apparatus of the present disclosure in an embodiment is configured to comprise a rule or ruler on one side of the slag removal apparatus allowing the user to measure as necessary without putting down the apparatus and picking up a separate measuring tape or tool.

Notwithstanding the preferred embodiment described herein, the present disclosure can be slightly modified to work with other types of material and product removal and smoothing such as wood, tile or aluminum after rough cutting. Incorporating modifications to the present disclosure will allow for additional excess materials to be easily and quickly removed from the product for cleaning, painting or other finishing purposes.

BACKGROUND OF THE DISCLOSURE

Slag is the byproduct of some arc welding processes. Slag forms during welding from flux. When the arc initializes and is stabilized, the filler metal of the electrode begins to liquefy and is deposited into the weld zone. Since the molten metal is fluid and has not cooled, it is much more prone to obtaining defects during the welding process and in the cooling period immediately afterward.

Specifically, welding processes that utilize slag have electrodes that either have a flux coating (Shielded metal arc welding), or flux embedded inside a tubular wire (Flux-cored arc welding). This flux is melted with the filler metal and produces gases that create a protective zone for the weld by pushing away other atmospheric gases like oxygen. However, not all of the flux evaporates or turns to gas. A remainder stays in the weld zone and rises to the top of the weld, leaving a slag, which also serves to protect the weld while cooling.

As such, welding flux is a combination of carbonate and silicate materials used in welding processes to shield the weld from atmospheric gases. When the heat of the weld zone reaches the flux, the flux melts and outgasses. The gases produced push the atmospheric gas back, preventing, oxidation (and reactions with nitrogen). The melted flux covers the molten metal in the weld zone. Flux materials are chosen so that the density of the melted flux/slag is lower than that of the metal being welded, so that the flux floats to the very top of the weld puddle and leaves pure or nearly pure metal to solidify below.

The American Welding Society (AWS) defines slag as "a nonmetallic byproduct of the mutual dissolution of flux with nonmetallic impurities in welding and brazing processes." In short, it is the hardened layer left on the top of weld made during flux-cored welding (FCAW). Slag in welding can be defined as "stony waste that is separated from metals during the smelting or refining of ore." Although the welding process does not use ore, likewise, welding slag is separated from the base and filler metals during welding. It can be chipped off and cleaned up later on, but it is not pure waste. The slag serves a purpose that helps the structural integrity of the weld.

After the welding is completed, the slag must be removed with a chipping hammer or slag hammer or a needle gun. Since slag acts as protection for the weld and is nonmetallic, it can cause a lack of fusion if an additional weld is deposited without removing the old slag.

It is possible for areas of slag to become embedded within the solidified metal, if it did not float to the top of the molten metal. These are called inclusions and are a form of welding defect. Inclusions may be visible on the surface after cleaning, or may be completely contained within the metal, in that case they can only be detected on X-rays of the weld, requiring grinding or drilling to remove, followed by re-welding of that section.

There are four welding processes that use flux in slag-producing manners. These are shielded metal arc welding (SMAW), flux-core arc welding (FCAW or FC), submerged arc welding, and electroslag welding.

Slag does not contribute to strength or protection of metals after the welding process. It is waste material and removal of the slag is necessary to be able to inspect the quality of the weld area. It is also important to be removed if a second layer or pass of welding is needed on top of the first. Finally, it is important to remove slag for aesthetic or visual appearance and to clean and clear the surface for coatings such as paint or oil.

Slag removal is usually done using manual or power tools. Manual tools may include welding or chipping hammers, which have a pointed tip on one end to break up large chunks of slag efficiently, or wire brushes. Power tools include angle grinders with Grinder disks or wire brush wheels.

Attempts have been made to create a slag removal tool that would facilitate and simplify the removal of slag material from a welded seam. U.S. Pat. No. 4,242,780, to Littman, entitled Hammer with Chipping Blade, which is incorporate herein by reference, discloses a chipping hammer for cleaning welds or deburring the oxidized metal about the cut from a cutting torch which comprises a handle and a head of unique configuration secured to an end of the handle. The head is secured at right angles to the axis of the handle and has a hammer head portion at one end and a toothed chipping blade at the other end. The ends of the teeth lie along a concave curve wherein the rearmost tooth extends outwardly from the blade a greater extent than does the front tooth. The '780 patent fails to disclose a device that uses multiple functions in the same instrument to remove slag. The user will need to use this device in concert with other devices to finish the slag removal process.

Another attempt is described in U.S. Pat. No. 5,433,005 to Codgill, et al., entitled Chipping hammer, and which is incorporated herein by reference. The '005 patent discloses a hammer and chisel device for clearing slag from welds that includes a chipping chisel interchangeably and springingly affixed within a weighted handle having a slip resistant grip. The '005 patent discloses providing for repeated one handed slag removal in which a sturdy chisel with a resilient cutting surface is replaceably received by the handle utilizing a releasable retaining washer and retaining ring. A spring within the handle returns the chisel shank to an extended position, thereby providing for repeatable hammer-like blows to the chisel shank by the handle. The handle or striking rod includes a chisel shank guide receiving track for consistent sequential strikes without axial rotation. A molded slip resistant grip minimizes necessary grip pressure and prevents hand slippage. Heavy construction provides sufficient force for quick, one handed operation. A slim design provides for easy handling and use in harder to reach places. Likewise, the '005 patent fails to provide more than one function for removing slag with the use of a single device.

Another attempt to disclose a slag removal device is described in South Korean Patent Application No. KR2020100012445U, entitled Welding Slag Removal Stick, and which is incorporated herein by reference. The '445 patent application discloses a device that functions to more efficiently remove slag caught in the weld bead. The '445 patent application includes a nut with a variety of functions. There is a bolt body that can be inserted into it, the nut is used alternately to fit the situation. The nut has a pair of chisel tips and a brush, a pair of fine slag removal tips and a wire brush. The chisel tip is inserted into the upper part of the body, and the snip part is inserted into the lower part to remove slag first. The snip part is hammered to remove the slag, providing a better surface. In order to use the different aspects of the device, the user must stop and remove the particular nut being used and replace it with another nut to be used. This takes time.

All of the references described herein pertain to devices that either do not provide the necessary multi-functionality for removing slag from a welded piece, or they tend to make any such multi-functional use time consuming in that different pieces must be screwed into place for their individual use. None of the systems disclosed provide the features, functionality, simplicity, ease of use and effectiveness of the present disclosure. Therefore, a need exists for a device which can simplify and facilitate the slag removal process by providing numerous functions in the slag removal process in a single device.

SUMMARY OF THE DISCLOSURE

In order to solve the above-mentioned shortcomings in welded slag removal, the present disclosure pertains to a novel slag removal apparatus that provides an integration of multiple slag removal tools into a single sleek design that can simplifying and facilitate the removal of slag from a welded product, without changing tools during the process. To do so, the preferred embodiment discloses a slag removal tool that combines an integrated curved sawtooth edge or file with a chipping hammer to facilitate the removal of slag from a welded piece. The slag removal tool disclosed herein eliminates the need to switch tools during the removal process, thereby speeding up the process from chipping to filing.

An objective of the present disclosure is to provide a novel and improved slag removal tool that combines an integrated curved or straight sawtooth edge or file with a chipping hammer in the same device and design, on opposite sides or on the same side. The integrated slag removal tool facilitates the removal of slag from a weld by eliminating the need to switch tools during the removal process.

Another objective of the present disclosure relates to an embodiment that combines an integrated sawtooth edge or file with a chipping hammer and a can opener or notched or oblong end with an edge for securing and opening various ring pull or pull tabs located on some metal containers, such as hermetically sealed welding rod cans. The notched shape provides proper leverage when removing the canister top by applying an even distribution to the tab and removing the tab and the top from the canister.

Yet another objective of the present disclosure relates to an embodiment that combines an integrated sawtooth edge or file with a chipping hammer and a rule or ruler on one side of the slag removal tool thereby allowing the user to measure any item as necessary without putting down the slag removal tool and mitigating the need to take the extra step of picking up a separate measuring tape or tool.

Yet another objective of the present disclosure relates to an embodiment that combines an integrated sawtooth edge or file with a chipping hammer and a wire brush for cleaning out the slag after removal using the chipping hammer and sawtooth edge or file. Again, the disclosed integrated slag removal tool facilitates the removal of a slag portion from a welded surface by eliminating the need to switch tools during the removal process.

An additional objective of the present disclosure relates to an embodiment that combines an integrated sawtooth edge or file with a chipping hammer in which the handle portion for the chipping hammer comprises an integrated spring for providing a good grip on the device and for reducing resonance during use. The handle device further comprises a slip resistant grip for additional gripping capabilities. Additionally or alternatively, the handle device may comprise a molded plastic, wood, metal or rubber material that provides a slip resistant grip.

As described herein, an objective of the present disclosure is to provide a method for slag removal in which the first step is to chip or hammer away a slag portion from the ends of the weld or welded surface, and then using the same device saw off or file the center and ends of the weld, to further remove slag and smooth out the surface of the weld. The notched end can be used to easily open and/or remove a pull tab top off from a metal container. Also, the integrated wire brush can be used in the final process to clean out and clean away the slag that has been removed during the procedure. The slag removal apparatus of the present disclosure in an embodiment is also used to facilitate the opening of a pull tab from a metal enclosure, and in an embodiment to file down the welded area to further smooth out the surface of the weld.

Notwithstanding the preferred embodiment for slag removal from a welded piece described herein, the present disclosure can be slightly modified to work with other types of materials for removal and smoothing of an unfinished product such as wood, tile or aluminum after rough cutting, for example. Incorporating modifications to the present disclosure will allow for additional excess materials to be easily and quickly removed from the product for cleaning, painting or other finishing purposes.

These and other aspects, features, and advantages of the present disclosure will become more readily apparent from the attached drawings, the detailed description of the preferred embodiment, and the recited claims, which follow.

DRAWINGS

The preferred embodiments of the disclosure will be described in conjunction with the appended drawings provided to illustrate and not to the limit the disclosure, where like designations denote like elements, and in which:

FIG. 1 shows a perspective view of a slag removal tool having an integrated chipping hammer and sawtooth edge, in accordance with the present disclosure.

FIG. 2 shows a perspective view of a slag removal tool having an integrated chipping hammer, a sawtooth edge and a notched end, in accordance with the present disclosure.

FIG. 3 shows a perspective view of a slag removal tool having an integrated chipping hammer, a sawtooth edge and a wire brush, in accordance with the present disclosure.

FIG. 4 shows a perspective view of a slag removal tool having an integrated chipping hammer with a spring grip and a sawtooth edge, in accordance with the present disclosure.

DETAILED DESCRIPTION

Figure 5:
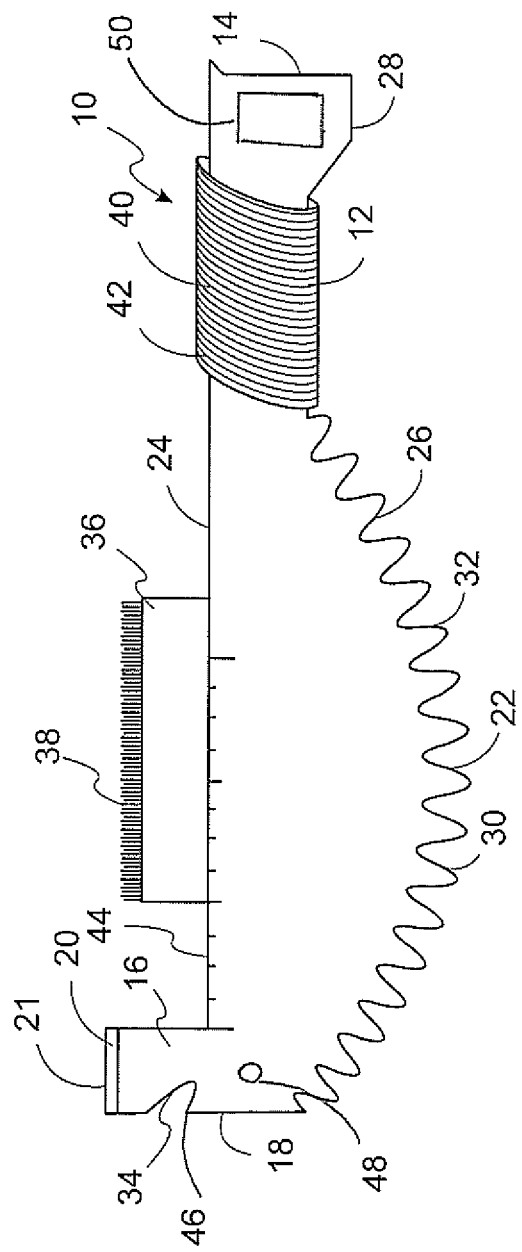
FIG. 5 shows a perspective view of a slag removal tool having an integrated chipping hammer with a spring grip, a sawtooth edge, a notched end and a wire brush, in accordance with the present disclosure.

As described herein, the present disclosure relates to a novel slag removal tool 10 for removing slag portions from a welded surface, and the method of using the slag removal tool 10. FIG. 1 shows the preferred embodiment of the slag removal tool 10, which comprises a handle 12 at the proximal end 14 of the tool 10, and a chipping hammer 16 at the distal end 18 of the tool 10. Additionally, the tool 10 comprises a blade 20, which comprises a sharp point 21, at the end of the chipping hammer 16 on the blade side 24, and a sawtooth edge 22 on the cutting side 26. The handle 12 comprises a handle grip or knob 28 closer to the proximal end 14.

The parts of the tool 10 are integrated so that the user can hold the slag removal tool 10 at the handle 12 and the knob 28 will keep the tool 10 from slipping out of the user's hand during use. As detailed herein, the handle 12 at or near the proximal end or base 14 of the slag removal tool 10, can be just the device itself, formed to fit a human hand, or it can be a spring-type device, made of wood, rubber or plastic (non-conductive material), or any material that allows the user to better grip the tool 10 during use. Alternatively, the handle device 12 may comprise a single-piece or multiple pieces molded plastic, held in place by fasteners or glue. The handle 12 may also be made of one or more pieces of wood, metal or rubber material, anything that provides a slip resistant grip.

The chipping hammer 16 on the hammer side 24 of the tool 10 can be used to remove thick slag or a slag portion by repeated blows or strikes to the slag portion or slag surface. The serrated side 26 can be used to remove large amounts of the slag portion or slag by a pulling or pushing motion of the sawtooth edge 22 across the surface of the slag portion. It is this dragging or pushing motion, instead of a hammer motion, that will remove large sections of the slag portion in just one pull of the slag removal tool 10 on the slag. In an alternative embodiment, the chipping hammer 16 can be located on the same side as the sawtooth side 26, thereby further decreasing the number of moved necessary to remove the slag portion.

The sawtooth or serrated edge 22 can also dig deep into the toes (as defined by the American Welding Society) of the weld to remove stubborn slag, which is very important when welding "code" quality joints on pipe or plate. This is commonly done to prevent slag inclusions, which must be removed before the next welded pass can be made or it may be seen in an x-ray when inspected. In addition, weldments that are subject to a destructive test must have all slag removed or the weldment could fail testing. The serrated edge 22 of the tool 10 has several teeth along the curved edge 22, which allow the teeth 32 to remove slag on both curved and straight weldments.

In the preferred embodiment, the slag removal tool 10 is made from hardened sheet metal, such as AR225, AR235 or AR400, and is 0.125 inches thick throughout the device (although other thicknesses can be used). This particular sheet metal is abrasive resistant and able to hold-up to repetitive blows and vibration. This sheet metal also allows for slag to be removed from harder materials such as, stainless steel, chromium alloys, nickel alloys, and others without damaging or rounding the teeth. Other materials and thicknesses can be used by themselves or in combination to provide similar characteristics can be used to obtain the same or similar results.

Alternative embodiments comprise a tool 10 that has a handle 12 and a knob 28 that are not flat and can have a round grip as described herein and as understood by one having ordinary skill in the art.

The slag removal apparatus 10 is approximately 12 inches in length, approximately 3 inches in width and 0.125 inches thick, and in the preferred embodiment, the slag removal tool 10 is 13.25 inches long from the proximal end 14 to the distal end 18, and 4.375 inches wide when measured from the tip of the blade 20 to the middle of the sawtooth edge 22 (when extended to be even with the blade 20). Additionally, the sawtooth edge has a 6 inch radius with a curve length of 9.5 inches. The curvature allows for slag to be removed effectively from flat plate and sheet metal but also from curved or round plate, sheet, pipe or tubing metal as well. An alternative embodiment comprises a straight sawtooth edge, or other shapes that can be employed to remove slag from the surface of a welded joint or surface.

The knob 28 is located at the proximal end, and the handle 12 is approximately 3.5 inches from the knob 28 to the beginning of the sawtooth edge 22. The sawtooth edge 22 is 4 to 4.5 inches from the proximal end 14 and continues to the distal end 18, but due to the curvature of the sawtooth edge 22, the perimeter 30 of the sawtooth edge 22 is longer.

The sawtooth edge contains a serrated side with several teeth 32 that, in the preferred embodiment, is 8.375 inches on each side. The number of teeth can vary depending on the size of the sawtooth edge 22 and the size of the teeth 32. In the preferred embodiment, there are about 53 teeth 32, but the number can vary with similar results. As with all of these dimensions in the preferred embodiment, alternative embodiments can utilize different dimensions and sizes to obtain the same or similar results.

Once a piece (or pieces) of metal have been welded together and the result is an unfinished piece of material or a welded surface containing slag to be removed, the slag removal tool 10 can be used. During the slag removal process, the tool 10 is held by the user at the handle 12 such that the blade side 24 is down and facing the welded piece, where the slag has been deposited. The user can use the chipping hammer 16 in a downward force such that the sharp edge 21 of the blade 20 of the chipping hammer 16 will strike the welded surface at the slag portion. This will remove some of the slag portion from the welded surface. This motion can be repeated numerous times to remove as much of the slag portion as is feasible with that step of the process.

Next, the user can reverse the grip on the handle 12, if the sawtooth edge 22 and the chipping hammer 16 are on opposite sides of the tool 10, such that the sawtooth side 26 is now facing downward. Using the sawtooth edge 22, the user can continue to saw, scrape or file the area of the weld in which remains slag. This step of the process, pushing and pulling the sawtooth edge 22 over the slag portion of the welded surface, will remove additional slag portion from the welded surface to get the weld and the piece closer to the finished form.

FIG. 2 shows an alternative embodiment of the slag removal tool 10 comprising an additional can opener or notch 34 in the distal end 18. In the preferred embodiment, the notch 34 is oblong shaped with an approximate opening that is 0.5 inches across and the opening is oblong and approximately 0.75 inches in depth. The notch 34 comprises an edge 46 configured to open a ring pull or pull tab (not shown) that often accompanies a metal canister, such as a hermetically sealed welding rod can with a tab (not shown). The user can use the edge 46 of the notch 34 to open a welding rod can without putting down the slag removal apparatus 10.

As for hermetically sealed welding rod cans or boxes, there are several different size boxes of rods, but the 50 pound box is the most commonly sold. The edge 46 of the notch or can opener 34 is sized and configured to help the tab on the can slide deep into the opening 34 to prevent slippage. Once the tab on the can is deep into the opening 34, the notch 34 can then rotate off the serrated side 26 of the tool 10 which is a semi-circular shape 30. The shape 30 creates leverage as it pushes upon the can which makes opening easy.

Again, the user can use the edge 46 of the notch 34 to slide in under the ring and force it to open. The shape of the notch 34 and location allows the user to impart proper leverage when removing the canister top by applying an even distribution to the tab and removing the tab and the top from the canister. Accordingly, the notch 34 can be used to remove the entire top (not shown) that is attached to the ring. This step allows the removal of the top of the canister or container without the user putting the tool 10 down and using his or her hands, thereby saving time and mitigating the chance of getting cut by the top.

FIG. 3 shows another alternative embodiment of the slag removal tool 10 comprising a wire brush 36 in which the user can clean and possibly finish the procedure for removing the slag portion from the welded surface. Although as described herein, the teeth 32 of the sawtooth edge 22 are intended to remove any stubborn slag when dragged, pulled, pushed or sawed across the weld, the wire brush 36 can be sized to allow the removal tool 10 to access the area of slag removal to clean up the residual slag that wasn't removed from the area. The wire brush 36 comprises multiple wires 38 bunched together to create the friction necessary to remove the residual slag from the welded portion. In use, the user reverses the grip of the handle 12 so that the chipping hammer 16 is again facing downward. The user can then run the wires 38 of the wire brush 36 across the welded portion in which the chipping hammer 16 and the sawtooth edge 22 were previously used thereby removing the slag residue.

FIG. 4 shows another alternative embodiment of the slag removal tool 10 comprising a spring handle 40, which wraps around the handle 12 and provides the user with a better grip of the tool 10. The spring handle 40 also provides a reduction in resonance when using the slag removal tool 10. Additionally, the handle 12 can incorporate a slip resistant grip 42 to further assist the user in gripping the slag removal tool 10. The spring handle 40 and the slip resistant grip 42 can be used together or can be used, one without the other. In alternative embodiments, the handle 12 may comprise a molded plastic, wood, metal or rubber material, attached by glue, fasteners, or other ways known in the industry, that will provide a slip resistant grip.

FIG. 4 also shows an alternative embodiment of the slag removal tool 10 comprising a rule or ruler 44 meant for measuring. The rule lines can be found on blade or flat side 24 of the slag removal tool 10 or the opposite side of the serrated teeth 26. The measuring rule 44 can have a range of zero to six inches in $\frac{1}{8}^{th}$ or $\frac{1}{16}^{th}$ inch increments, although any range and increments can be used, as understood by one having ordinary skill in the art. The rule 44 provides a measuring tool 44 as measurements in the welding industry are commonly used, and the user will not have to put the tool 10 down to separately pick up a measuring tape or ruler to measure certain items while using the tool 10. This rule 44 can be held off of the 90-degree hammer side to ensure a straight line.

FIG. 5 shows yet another alternative embodiment of the slag removal tool 10 comprising all of the features described herein. The slag removal tool 10 comprises a handle 12 containing a spring handle 40 and a slip resistant grip 42 (although any type of slip resistant handle will work), a chipping hammer 16 with the chipping blade 20, a sawtooth edge 22 with multiple teeth 32, a notch 34, a rule 44 and a wire brush 36 with multiple wires 38.

An alternative embodiment comprises an opening or hole 48 and/or a cutaway portion, hang tag or rope 50 for hanging the slag removal tool when not in use. The opening or hole 48 can be at the distal end or proximal end and the opening or hole 48 and/or a cutaway portion, hang tag or rope 50 can be included when forming the handle 12, or can be cut into the tool 10 itself. The tool 10 can then be hung from either side, depending on the location of the opening.

The slag removal tool 10 of this embodiment allows the user to remove any canister tops, as necessary, chip away at the slag portion and saw or file the slag portion of the welded surface, measure as necessary and use the wire brush to further clean and finish the area where the slag portion was removed. The entire process is accomplished with a single integrated slag removal tool 10, without the need to use another tool.

It will be understood that the embodiments of the present disclosure, which have been described, are illustrative of some of the applications of the principles of the present disclosure. Although numerous embodiments of this disclosure have been described above with a certain degree of particularity, those skilled in the art could alter the disclosed embodiments without departing from the spirit or scope of this disclosure.

All directional references (e.g., upper, lower, upward, downward, left, right, distal, proximate, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosed system and methods.

Additionally, joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosed apparatus, system and methods as disclosed herein.

What is claimed is:

1. A slag removal apparatus for removing a slag portion from a welded surface, comprising:
   a handle, said handle located at a proximal end of said slag removal apparatus;
   a sawtooth edge, said sawtooth edge located near a distal end of said slag removal apparatus, said sawtooth edge being curvilinear, said sawtooth edge comprising a plurality of teeth, said plurality of teeth having a thickness uniform in width with the handle of the slag removal apparatus, without beveled or cross-hatched teeth, to remove slag from said welded surface when drawn or pushed across the slag portion; and
   a chipping hammer, said chipping hammer located near said distal end of said slag removal apparatus, said chipping hammer comprising a blade, said blade comprising a sharp point to remove said slag portion from said welded surface when the blade strikes the slag portion;
   a notch, said notch located near said distal end of said slag removal apparatus, said notch forming an edge, said edge shaped such that said edge secures a ring pull on a metal compartment for removing the pull off top of the compartment;
   said integrated slag removal apparatus sized approximately 13.25 inches long and approximately 4.375 inches wide and approximately 0.125 inches thick throughout the device, such that said sawtooth edge is thicker than a saw blade used for cutting, and made from hardened sheet metal, thereby providing a sufficient thickness of the sawtooth edge to allow for the removal of said slag portion from said welded surface;
   said handle, sawtooth edge, notch and said chipping hammer integrated into a single tool, thereby facilitating the removal of said slag portion from said welded surface by eliminating the need to change tools during said slag portion removal.

2. The slag removal apparatus according to claim 1, wherein said hardened sheet metal is AR225, AR235 or AR400.

3. The slag removal apparatus according to claim 1, wherein said sawtooth edge has a radius that is approximately 6 inches, and a curve length of approximately 9.5 inches.

4. The slag removal apparatus according to claim 1, wherein said sawtooth edge has approximately 53 teeth.

5. The slag removal apparatus according to claim 1, wherein said chipping hammer is located on the opposite side of said sawtooth edge.

6. The slag removal apparatus according to claim 1, wherein said chipping hammer is located on the same side of said sawtooth edge.

7. The slag removal apparatus according to claim 1, wherein said handle comprises at least one plastic molded piece.

8. The slag removal apparatus according to claim 7, wherein said plastic molded piece is attached to said slag removal tool using fasteners.

9. The slag removal apparatus according to claim 1, wherein said handle comprises a rope or cord.

10. The slag removal apparatus according to claim 9, wherein said rope or cord comprises a paracord wrap.

11. The slag removal apparatus according to claim 1, further comprising a wire brush, said wire brush located near said distal end of said slag removal apparatus, said wire brush integrated into said slag removal apparatus for facilitating the removal of said slag portion from said welded surface.

12. The slag removal apparatus according to claim 1, further comprising a measuring device, said measuring device located near said distal end of said slag removal apparatus, said measuring device integrated into said slag removal apparatus for measuring purposes.

13. The slag removal apparatus according to claim 1, further comprising a hole in the distal end for hanging said slag removal apparatus when not in use.

14. The slag removal apparatus according to claim 1, further comprising a hook in the proximal end for hanging said slag removal apparatus when not in use.

* * * * *